United States Patent
Goto et al.

(10) Patent No.: US 12,476,770 B2
(45) Date of Patent: Nov. 18, 2025

(54) WIRELESS COMMUNICATION SYSTEM, RELAY DEVICE, AND CHANNEL SETTING METHOD

(71) Applicant: NTT, Inc., Tokyo (JP)

(72) Inventors: Daisuke Goto, Musashino (JP); Kiyohiko Itokawa, Musashino (JP); Yasuyoshi Kojima, Musashino (JP); Fumihiro Yamashita, Musashino (JP)

(73) Assignee: NTT, Inc.

( * ) Notice: Subject to any disclaimer, the term of this patent is extended or adjusted under 35 U.S.C. 154(b) by 473 days.

(21) Appl. No.: 17/926,880

(22) PCT Filed: Jun. 5, 2020

(86) PCT No.: PCT/JP2020/022228
§ 371 (c)(1),
(2) Date: Nov. 21, 2022

(87) PCT Pub. No.: WO2021/245897
PCT Pub. Date: Dec. 9, 2021

(65) Prior Publication Data
US 2023/0231691 A1    Jul. 20, 2023

(51) Int. Cl.
*H04L 5/00*      (2006.01)
*H04W 16/10*    (2009.01)
(Continued)

(52) U.S. Cl.
CPC ........... *H04L 5/0096* (2013.01); *H04W 16/10* (2013.01); *H04W 36/30* (2013.01);
(Continued)

(58) Field of Classification Search
CPC .... H04L 5/0096; H04L 5/0092; H04W 16/10; H04W 36/30; H04W 72/0453;
(Continued)

(56) References Cited

U.S. PATENT DOCUMENTS

2003/0003874 A1    1/2003    Nitta et al.
2015/0065157 A1*   3/2015    Homchaudhuri ... H04W 72/541
                                                       455/452.1

(Continued)

FOREIGN PATENT DOCUMENTS

JP              2003018073         1/2003

OTHER PUBLICATIONS

Usman et al., "Low Power Wide Area Networks: An Overview," IEEE Communications Surveys & Tutorials, 2017, 19(2):855-872, 19 pages.

*Primary Examiner* — Yu-Wen Chang
(74) *Attorney, Agent, or Firm* — Fish & Richardson P.C.

(57) ABSTRACT

A wireless communication system includes one or more communications apparatuses, and a relay device, which is mobile, wherein the relay device includes a transmission unit adapted to transmit a channel change signal to the one or more communications apparatuses, the channel change signal containing channel information that indicates results corresponding to interference levels of a plurality of channels in a frequency band available for use in uplink transmission from the one or more communications apparatuses to the relay device and specifying information used to specify a communications apparatus subject to channel change, and the one or more communications apparatuses include a channel set unit adapted to set a channel having an interference level lower than a threshold as a channel to be used for communications with the relay device when the specifying information contained in the channel change signal is applicable.

6 Claims, 3 Drawing Sheets

(51) Int. Cl.
*H04W 36/30* (2009.01)
*H04W 72/0453* (2023.01)
*H04W 72/541* (2023.01)
*H04W 84/06* (2009.01)

(52) U.S. Cl.
CPC ..... *H04W 72/0453* (2013.01); *H04W 72/541* (2023.01); *H04W 84/06* (2013.01)

(58) Field of Classification Search
CPC . H04W 72/541; H04W 84/06; H04W 84/005; H04W 84/047; H04B 7/18513
See application file for complete search history.

(56) References Cited

U.S. PATENT DOCUMENTS

| | | | |
|---|---|---|---|
| 2019/0007946 A1* | 1/2019 | Yerramalli | H04B 1/713 |
| 2019/0028930 A1* | 1/2019 | Zhang | H04W 28/16 |
| 2019/0075549 A1* | 3/2019 | Yucek | H04W 72/02 |
| 2020/0329470 A1* | 10/2020 | Liu | H04L 12/2801 |
| 2023/0209586 A1* | 6/2023 | Challita | H04W 28/0226 370/329 |

* cited by examiner

WIRELESS COMMUNICATION SYSTEM, RELAY DEVICE, AND CHANNEL SETTING METHOD

CROSS-REFERENCE TO RELATED APPLICATIONS

This application is a National Stage application under 35 U.S.C. § 371 of International Application No. PCT/JP2020/022228, having an International Filing Date of Jun. 5, 2020. The disclosure of the prior application is considered part of the disclosure of this application, and is incorporated by reference in its entirety into this application.

TECHNICAL FIELD

The present invention relates to a wireless communication system, a relay device and a channel setting method.

BACKGROUND ART

With the development of IoT (Internet of Things) technology, installation of IoT terminals equipped with various sensors in various locations is being considered. For example, IoT terminals are expected to be utilized to collect data in places, such as on buoys or ships on the ocean or in mountainous regions, where base stations are difficult to install.

A technique for wirelessly communicating between IoT terminals and UAVs (Unmanned Aerial Vehicles) or geostationary satellites has been proposed. IoT terminals, many of which do not carry large power supplies as with sensors, are desirably capable of operating with low power consumption. Thus, IoT terminals often use LPWA (Low Power Wide Area) that achieves power savings, wide areas, and low costs (see, for example, Non-patent Literature 1).

It is stated in Non-patent Literature 1 that LTE (Long Term Evolution) and other similar control that effectively allocate time-frequency resources lead to cost increases due to increases in overhead. Therefore, Non-patent Literature 1 states that LPWA selects a simple random access system.

CITATION LIST

Non-Patent Literature

Non-Patent Literature 1: Raza, Usman, Parag Kulkarni, and Mahesh Sooriyabandara, "Low Power Wide Area Networks: An Overview", IEEE Communications Surveys & Tutorials 19.2 (2017): 855-873.

SUMMARY OF THE INVENTION

Technical Problem

When wireless communication is conducted between IoT terminals and a moving low-earth-orbit satellite, increases in the number of IoT terminals communicating with the low-earth-orbit satellite result in increases in the probability that channels in a frequency band used by the individual IoT terminals will overlap. Furthermore, the frequency band used between the IoT terminals and the low-earth-orbit satellite is also used by other devices that do not conduct communications with the low-earth-orbit satellite. In such a case, the other devices can become interference sources, which may make it impossible to conduct communications efficiently between the IoT terminals and the low-earth-orbit satellite.

In view of the above circumstances, the present invention has an object to provide a technique that allows even an inexpensive communications device to conduct communications efficiently with a moving moving-body.

Means for Solving the Problem

According to one aspect of the present invention, there is provided a wireless communication system comprising: one or more communications apparatuses; and a relay device, which is mobile, wherein the relay device includes a transmission unit adapted to transmit a channel change signal to the one or more communications apparatuses, the channel change signal containing channel information that indicates results corresponding to interference levels of a plurality of channels in a frequency band available for use in uplink transmission from the one or more communications apparatuses to the relay device and specifying information used to specify a communications device subject to channel change, and the one or more communications apparatuses include a channel set unit adapted to set a channel having an interference level lower than a threshold as a channel to be used for communications with the relay device when the specifying information contained in the channel change signal is applicable.

According to another aspect of the present invention, there is provided a relay device, which is mobile, in a wireless communication system that includes one or more communications apparatuses and the relay device, the relay device comprising a transmission unit adapted to transmit a channel change signal to the one or more communications apparatuses, the channel change signal containing channel information that indicates results corresponding to interference levels of a plurality of channels in a frequency band available for use in uplink transmission from the one or more communications apparatuses to the relay device and specifying information used to specify a communications apparatus subject to channel change.

According to another aspect of the present invention, there is provided a channel setting method for a wireless communication system that includes one or more communications apparatuses and a relay device, which is mobile, the channel setting method comprising: causing the relay device to transmit a channel change signal to the one or more communications apparatuses, the channel change signal containing channel information that indicates results corresponding to interference levels of a plurality of channels in a frequency band available for use in uplink transmission from the one or more communications apparatuses to the relay device and specifying information used to specify a communications apparatus subject to channel change; and causing the one or more communications apparatuses to set a channel having an interference level lower than a threshold as a channel to be used for communications with the relay device when the specifying information contained in the channel change signal is applicable.

Effect of the Invention

The present invention allows even an inexpensive communications device to conduct communications efficiently with a moving moving-body.

DESCRIPTION OF EMBODIMENTS

Embodiments of the present invention will be described in detail below with reference to the accompanying drawings.

First Embodiment

Figure 1:
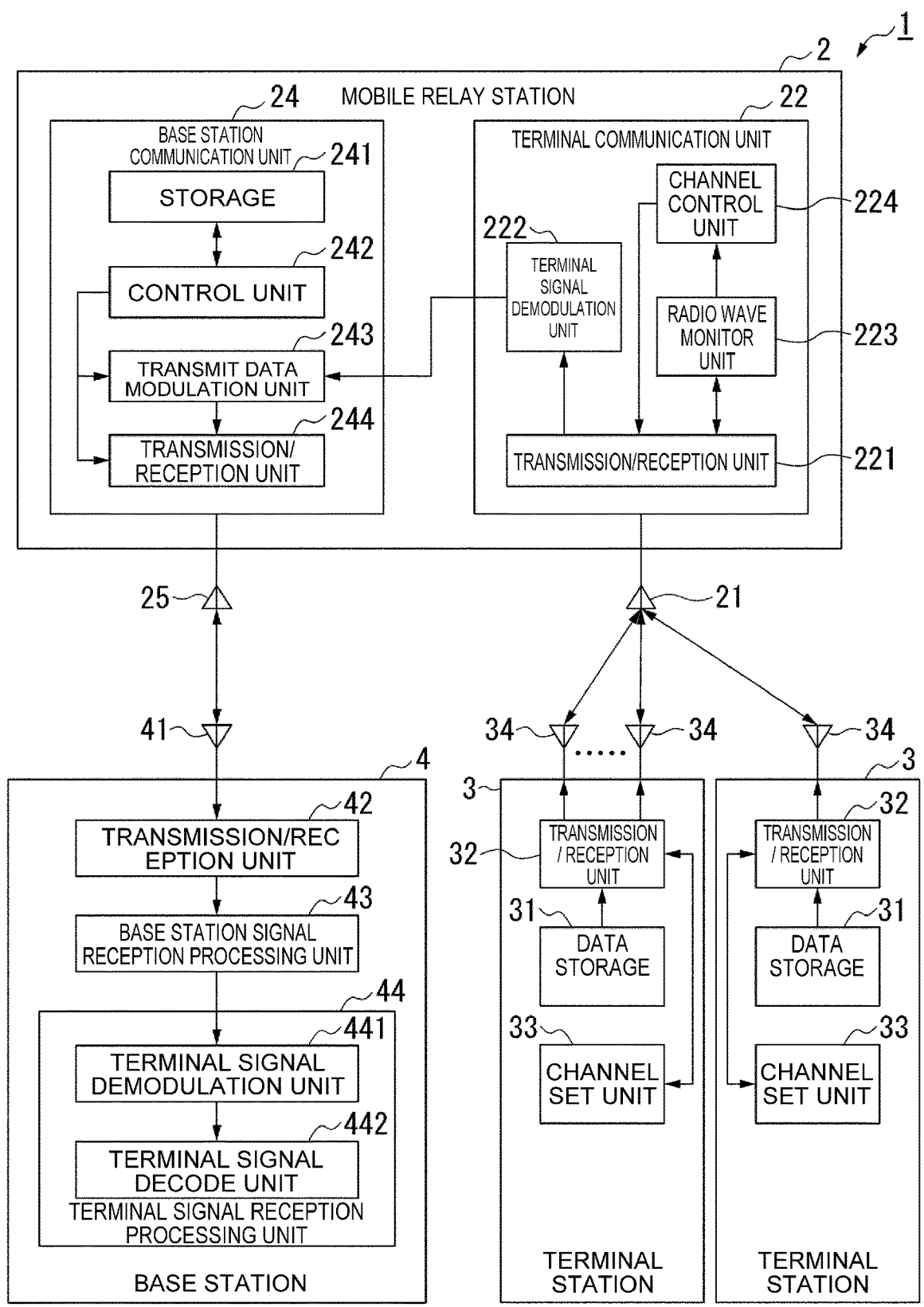
FIG. 1 is a configuration diagram of a wireless communication system according to a first embodiment.

FIG. 1 is a configuration diagram of a wireless communication system 1 according to a first embodiment. The wireless communication system 1 includes a mobile relay station 2, one or more terminal stations 3, and a base station 4. The number of each of the mobile relay stations 2, the terminal stations 3, and the base stations 4 included in the wireless communication system 1 is arbitrary It is assumed that there are a large number of terminal stations 3.

The mobile relay station 2 is an example of a relay device mounted on a moving body, and an area in which the mobile relay station 2 can perform communication moves with the passage of time. The mobile relay station 2 is provided in, for example, a low Earth orbit (LEO) satellite. The altitude of the LEO satellite is 2000 km or less, and the LEO satellite orbits over the Earth in about 1.5 hours. While moving over the Earth, the mobile relay station 2 receives data transmitted from the terminal station 3, as a wireless signal. The mobile relay station 2 transmits the received data to the base station 4 by wireless. Hereinafter signals transmitted from the mobile relay station 2 to the base station 4 will be referred to as downlink signals.

The terminal station 3 collects data such as environmental data detected by a sensor and wirelessly transmits the data to the mobile relay station 2. The terminal station 3 is, for example, an IoT terminal. Hereinafter signal transmitted from the terminal station 3 to the mobile relay station 2 will be referred to as terminal uplink signal.

The base station 4 receives the data collected by the terminal station 3 from the mobile relay station 2. The terminal stations 3 and the base station 4 according to the first embodiment are installed at specific positions on earth such as on the ground or on the ocean.

It is conceivable to use a relay device mounted on an unmanned aerial vehicle such as a geostationary satellite, a drone or a high altitude platform station (HAPS) as a mobile relay station. However, in the case of a relay station mounted on a geostationary satellite, the coverage area (footprint) on the ground is wide, but a link budget for IoT terminals installed on the ground is considerably small due to a high altitude. On the other hand, in the case of a relay station mounted on a drone or a HAPS, the link budget is high, but the coverage area is narrow.

Furthermore, drones require batteries and HAPS require solar panels. According to the first embodiment, the mobile relay station 2 is mounted on a LEO satellite. Therefore, in addition to keeping the link budget within a limit, the LEO satellite has no air resistance and consumes less fuel because it orbits outside the atmosphere. In addition, the footprint is also large as compared to the case where a relay station is mounted on a drone or a HAPS.

The mobile relay station 2 according to the first embodiment are assumed to conduct communications with a large number of terminal stations 3. Increases in the number of terminal stations 3 communicating with the mobile relay station 2 also result in increases in the probability that channels in a frequency band used by the individual terminal stations 3 will overlap.

Furthermore, the frequency band used between the mobile relay station 2 and the terminal stations 3 is also used by other devices that do not conduct communications with the mobile relay station 2. In such a case, the other devices can become interference sources, which may make it impossible to conduct communications efficiently between the mobile relay station 2 and the terminal stations 3.

Taking this into account, according to the first embodiment, the mobile relay station 2 transmits a channel change signal containing channel information and specifying information to the terminal stations 3, where the channel information includes information (hereinafter referred to as "interfering-channel information") indicating any channel whose interference level is equal to or higher than a threshold out of plural channels in a frequency band available for use in uplink transmission, and the specifying information identifies any terminal station 3 subject to channel change.

For example, when LPWA-based communications are conducted between the mobile relay station 2 and the terminal stations 3, out of channels (24 to 61) available for use for LPWA, the mobile relay station 2 measures interference levels of the channels in a frequency band available for use in uplink transmission. If there are one or more channels whose interference levels are equal to or higher than the threshold, the mobile relay station 2 performs a channel setting process for the terminal stations 3.

First, if the interference level of channel "24" is equal to or higher than the threshold, the mobile relay station 2 generates channel information including interfering-channel information (e.g., channel "24").

Next, according to a predetermined condition, the mobile relay station 2 determines a terminal station 3 subject to channel change. For example, it is assumed that all the terminal stations 3 have been assigned predetermined numbers in a predetermined range, and the mobile relay station 2 selects a number randomly from the predetermined numbers. The terminal station 3 corresponding to the selected number is subject to channel change.

Then, by designating the selected number as specifying information, the mobile relay station 2 generates a channel change signal using the specifying information and the channel information. The mobile relay station 2 transmits the generated channel change signal to the terminal stations 3 that can communicate. In so doing, the mobile relay station 2 uses a channel whose interference level is lower than the threshold to transmit the channel change signal to the terminal stations 3. Because the mobile relay station 2 is moving, there are terminal stations 3 that cannot receive the channel change signal. The terminal stations 3 that cannot receive the channel change signal are not subject to channel change.

Each of the terminal stations 3 that receive the channel change signal transmitted from the mobile relay station 2 determines whether or not the specifying information contained in the channel change signal is applicable to the terminal station 3. When the specifying information contained in the channel change signal is applicable to the terminal station 3, the terminal station 3 sets the channel to be used for communications with the mobile relay station 2 to a channel whose interference level is lower than the threshold. The specifying information being applicable means that the number indicated as specifying information matches the number assigned to the terminal station 3.

The terminal station 3 to which the specifying information is applicable selects, for example, a channel other than the channel indicated by the channel information. The terminal station 3 may select any channel whose interference level is lower than the threshold. Then, the terminal station 3 sets the selected channel as a channel to be used for communications with the mobile relay station 2. Subsequently, communications are conducted between the mobile relay station 2 and the terminal stations 3.

A configuration in which the mobile relay station 2 generates channel information including interfering-channel information is shown in the above example. The channel information may include not only the interfering-channel information, but also information (hereinafter referred to as "non-interfering-channel information") indicating channels whose interference levels are lower than the threshold. Which of the interfering-channel information and non-interfering-channel information is included in the channel information may be determined in advance between the mobile relay station 2 and the terminal stations 3. Alternatively, a sign identifying the information may be attached to the information.

Configurations of individual devices will be described.

The mobile relay station 2 includes an antenna 21, a terminal communication unit 22, a base station communication unit 24, and an antenna 25.

The terminal communication unit 22 includes a transmission/reception unit 221 (transmitter), a terminal signal demodulation unit 222, a wireless wave monitor unit 223, and a channel control unit 224 (channel controllor).

The transmission/reception unit 221 conducts communications with the terminal stations 3. For example, the transmission/reception unit 221 receives terminal uplink signals via the antenna 21. For example, the transmission/reception unit 221 transmits channel change signals to the terminal stations 3 via the antenna 21. When transmitting the channel change signals to the terminal stations 3, the transmission/reception unit 221 transmits the channel change signals to the terminal stations 3 using channels whose interference levels are lower than the threshold.

The terminal signal demodulation unit 222 demodulates the terminal uplink signals received by the transmission/reception unit 221 and outputs the demodulation results as demodulation information to the base station communication unit 24.

The wireless wave monitor unit 223 scans plural channels in a frequency band available for use in uplink transmission from the terminal stations 3 to the mobile relay station 2, either periodically (e.g., every 10 minutes) or at a predetermined timing. The predetermined timing may coincide with a preset time or with when the mobile relay station 2 has just moved a preset distance. Scanning a channel means measuring an interference level of the channel. That is, the wireless wave monitor unit 223 measures the interference levels of the channels in the frequency band available for use in uplink transmission.

Based on the interference levels of the respective channels measured by the wireless wave monitor unit 223, the channel control unit 224 controls the channels of the terminal stations 3 subject to channel change. Specifically, first the channel control unit 224 determines whether or not there is any channel whose interference level is equal to or higher than the threshold. If there are one or more channels whose interference levels are equal to or higher than the threshold, the channel control unit 224 performs the following process. On the other hand, if there is no channel whose interference level is equal to or higher than the threshold, the channel control unit 224 does not perform the process by regarding that interference has an insignificant impact.

Process Performed When There are One or More Channels Whose Interference Levels are Equal to or Higher Than Threshold The channel control unit 224 generates channel change signals that contain channel information that indicates results corresponding to the interference levels of plural channels in a frequency band available for use in uplink transmission and specifying information used to specify the terminal stations 3 subject to channel change. The channel control unit 224 makes the transmission/reception unit 221 transmit the generated channel change signals to the terminal stations 3 and thereby controls the channels used by the terminal stations 3 subject to channel change. When using predetermined numbers assigned in advance to the terminal stations 3 as specifying information, it is assumed that the channel control unit 224 stores information about the numbers assigned to the terminal stations 3.

The base station communication unit 24 transmits receive waveform information to the base station 4 using a downlink signal of a desired wireless communication scheme. The base station communication unit 24 includes a storage 241, a control unit 242, a transmit data modulation unit 243, and a transmission unit 244.

The storage 241 stores precalculated transmission start timing based on orbital information about the LEO satellite carrying the mobile relay station 2 and the position of the base station 4. The orbital information about the LEO satellite provides information about the position, velocity, moving direction, and the like of the LEO satellite at any desired time. Send time may be expressed, for example, by elapsed time with respect to the transmission start timing.

The control unit 242 controls the transmit data modulation unit 243 and the transmission unit 244 such that the receive waveform information will be transmitted to the base station 4 at the transmission start timing that is stored in the storage 241.

The transmit data modulation unit 243 reads the receive waveform information as transmit data out of a data storage 23, modulates the read transmit data, and thereby generates a base station downlink signal.

The transmission unit 244 converts the base station downlink signal from an electric signal into a wireless signal and transmits the resulting signal from the antenna 25.

The terminal station 3 includes a data storage 31, a transmission/reception unit 32, a channel set unit 33 (channel setter), and one or more antennas 34.

The data storage 31 stores sensor data and the like. When using predetermined numbers assigned in advance to the terminal stations 3 as specifying information, the data storage 31 may store information about the assigned numbers.

The transmission/reception unit 32 conducts communications with the mobile relay station 2. For example, the transmission/reception unit 32 reads sensor data as terminal transmit data out of the data storage 31. The transmission/reception unit 32 wirelessly transmits a terminal uplink signal containing the read terminal transmit data from the antennas 34. For example, the transmission/reception unit 32 receives the channel change signal transmitted from the mobile relay station 2 and outputs the channel change signal to the channel set unit 33.

The transmission/reception unit 32 transmits and receives signals using, for example, LPWA. Examples of LPWA include LoRaWAN®, Sigfox®, LTE-M (Long Term Evolution for Machines), and NB (Narrow Band)-IoT, and any desired wireless communication scheme can be used. The transmission/reception unit 32 may exchange data with other terminal stations 3 using time-division multiplexing, OFDM (Orthogonal Frequency Division Multiplexing), or the like.

By a predetermined method in the wireless communication scheme to be used, the transmission/reception unit 32 determines transmission timing to be used by the local station to transmit a terminal uplink signal. The transmission/reception unit 32 conducts communications using the channel set by the channel set unit 33. By a predetermined method in the wireless communication scheme to be used, the transmission/reception unit 32 may also form beams of signals to be transmitted from the plural antennas 34.

When the specifying information contained in the channel change signal is applicable to the terminal station 3, the channel set unit 33 sets the channel to be used for communications with the mobile relay station 2 to a channel whose interference level is lower than the threshold. At start-up or at the start of communications with the mobile relay station 2, using a method preset by the wireless communication scheme to be used, the channel set unit 33 sets the channel to be used by the local station to transmit a terminal uplink signal on the transmission/reception unit 32.

The base station 4 includes an antenna 41, a transmission/reception unit 42, a base station signal reception processing unit 43, and a terminal signal reception processing unit 44. The transmission/reception unit 42 converts a terminal downlink signal received via the antenna 41 into an electric signal. The base station signal reception processing unit 43 demodulates and decodes the receive signal converted into an electric signal by the transmission/reception unit 42 and thereby obtains receive waveform information. The base station signal reception processing unit 43 outputs the receive waveform information to the terminal signal reception processing unit 44.

The terminal signal reception processing unit 44 performs a reception process for the terminal uplink signal indicated by the receive waveform information. In so doing, the terminal signal reception processing unit 44 acquires terminal transmit data by performing a reception process based on the wireless communication scheme used for transmission by the terminal station 3. The terminal signal reception processing unit 44 includes a terminal signal demodulation unit 441 and a terminal signal decode unit 442.

The terminal signal demodulation unit 441 demodulates waveform data and outputs a symbol obtained by the demodulation to the terminal signal decode unit 442. The terminal signal demodulation unit 441 may perform demodulation after compensating the signal indicated by the waveform data for the Doppler shift of the terminal uplink signal received by the antenna 21 of the mobile relay station 2. The Doppler shift that impacts the terminal uplink signal received by the antenna 21 is calculated in advance based on the position of the terminal station 3 and the orbital information about the LEO satellite carrying the mobile relay station 2. The terminal signal decode unit 442 decodes the symbol demodulated by the terminal signal demodulation unit 441 and thereby obtains the terminal transmit data transmitted from the terminal station 3.

Operation of the wireless communication system 1 will be described.

Figure 2:
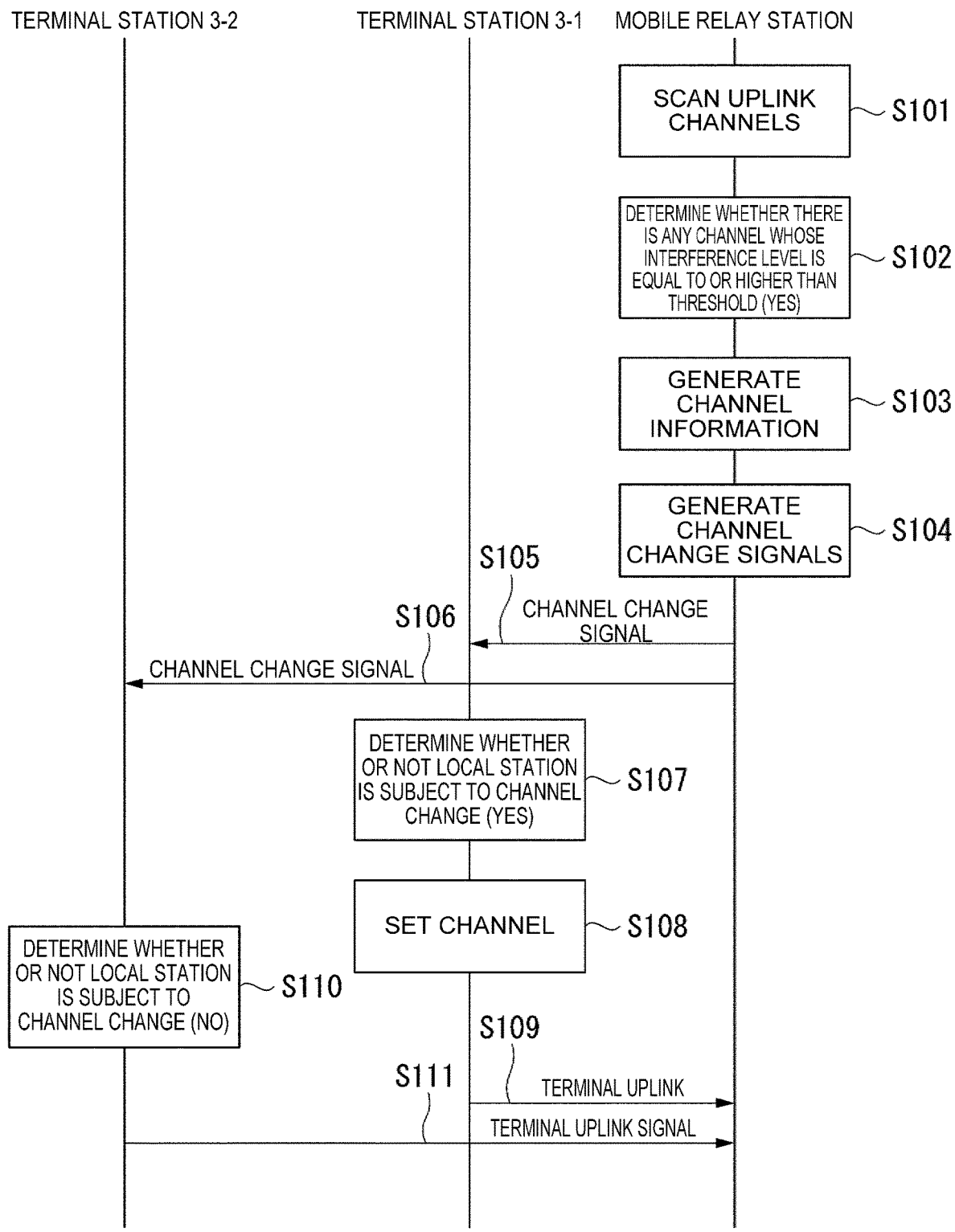
FIG. 2 is a sequence diagram showing a flow of a channel setting process of the wireless communication system according to the first embodiment.

FIG. 2 is a sequence diagram showing a flow of a channel setting process of the wireless communication system 1 according to the first embodiment. In FIG. 2, description will be given by taking as an example a case in which two terminal stations 3 (terminal station 3-1 and terminal station 3-2) are provided in the wireless communication system 1. To distinguish functional parts of the two terminal stations 3-1 and 3-2 from each other, branch numbers "-1" and "-2" are assigned to the respective functional parts. The process shown in FIG. 2 is performed either periodically or when a predetermined timing elapses.

The wireless wave monitor unit 223 of the mobile relay station 2 scans the channels in the frequency band available for use in uplink transmission (step S101). The wireless wave monitor unit 223 outputs channel scan results to the channel control unit 224. Based on the channel scan results outputted from the wireless wave monitor unit 223, the channel control unit 224 determines whether or not there is any channel whose interference level is equal to or higher than the threshold (step S102).

If there are one or more channels whose interference levels are equal to or higher than the threshold, the channel control unit 224 performs the process of step S103.

On the other hand, if there is no channel whose interference level is equal to or higher than the threshold, the channel control unit 224 finishes the process of FIG. 2.

The channel control unit 224 generates channel information based on the channel scan results (step S103). For example, the channel control unit 224 generates channel information using interfering-channel information. Next, according to a predetermined condition, the channel control unit 224 determines a terminal station 3 subject to channel change.

For example, the channel control unit 224 selects a number randomly from stored predetermined numbers. The channel control unit 224 determines any terminal station 3 corresponding to the selected number as being subject to channel change. The channel control unit 224 generates channel change signals using the interfering-channel information and specifying information (step S104).

The channel control unit 224 controls and thereby makes the transmission/reception unit 221 transmit the generated channel change signals to the terminal stations 3-1 and 3-2. In so doing, as a channel for use to transmit the channel change signals, the channel control unit 224 sets a channel whose interference level is lower than the threshold on the transmission/reception unit 221. The transmission/reception unit 221 transmits the channel change signals to the terminal stations 3-1 and 3-2 using the set channel (steps S105 and S106).

A transmission/reception unit 32-1 of the terminal station 3-1 receives the channel change signal transmitted from the mobile relay station 2. The transmission/reception unit 32-1 outputs the received channel change signal to a channel set unit 33-1.

Based on the inputted channel change signal, the channel set unit 33-1 determines whether or not the local station is subject to channel change (step S107). Specifically, first the channel set unit 33-1 acquires the specifying information contained in the channel change signal. Next, the channel set unit 33-1 acquires the information about the number stored in a data storage 31-1. Then, the channel set unit 33-1 compares the number indicated by the specifying information with the number indicated by the acquired information.

If the number indicated by the specifying information matches the number indicated by the acquired information, the channel set unit 33-1 determines that the local station is subject to channel change. On the other hand, if the number indicated by the specifying information matches does not match the number indicated by the acquired information, the channel set unit 33-1 determines that the local station is not subject to channel change.

Suppose, it is found at the terminal station 3-1 that the number indicated by the specifying information matches the number indicated by the acquired information. In this case, the channel set unit 33-1 sets the channel of the local station (step S108). Specifically, first the channel set unit 33-1 acquires the channel information contained in the channel change signal. Next, the channel set unit 33-1 sets the channel indicated by the acquired channel information as a channel to be used for communications with the mobile relay station 2. For example, the channel set unit 33-1 sets the channel indicated by the channel information on the transmission/reception unit 32-1.

The transmission/reception unit 32-1 transmits a terminal uplink signal by wireless via an antenna 34-1 at the transmission timing after the channel is set by the channel set unit 33-1.

A transmission/reception unit 32-2 of the terminal station 3-2 receives the channel change signal transmitted from the mobile relay station 2. The transmission/reception unit 32-2 outputs the received channel change signal to a channel set unit 33-2.

Based on the inputted channel change signal, the channel set unit 33-2 determines whether or not the local station is subject to channel change (step S110). Specifically, first the channel set unit 33-2 acquires the specifying information contained in the channel change signal. Next, the channel set unit 33-2 acquires the information about the number stored in a data storage 31-2. Then, the channel set unit 33-2 compares the number indicated by the specifying information with the number indicated by the acquired information.

Suppose, it is found at the terminal station 3-2 that the number indicated by the specifying information does not match the number indicated by the acquired information. In this case, the channel set unit 33-2 determines that the local station is not subject to channel change. Therefore, the terminal station 3-2 conducts communications with the mobile relay station 2 through a channel set at the start of the process shown FIG. 2. The transmission/reception unit 32-2 transmits a terminal uplink signal by wireless via an antenna 34-2 at the channel transmission timing established currently.

In the wireless communication system 1 configured as described above, the mobile relay station 2 transmits channel change signals that contain channel information and specifying information to the terminal stations 3. When the specifying information contained in the channel change signal is applicable to the terminal station 3, the channel set unit 33 of the terminal station 3 sets the channel to be used for communications with the mobile relay station 2 to a channel whose interference level is lower than the threshold. In this way, the mobile relay station 2 notifies the terminal station 3 of the terminal station 3 subject to channel change and the channel information for use in making the channel change. When the local station is subject to channel change, the terminal station 3 sets the local station to a channel whose interference level is lower than the threshold, based on the channel information for use in making the channel change. Consequently, some of the terminal stations 3 conducting communications with the mobile relay station 2 are set to channels other than those whose interference levels are equal to or higher than the threshold. Since the impact of interference on communications is suppressed, retransmission that would otherwise take place when there is the impact of interference on communications can be reduced at the terminal stations 3. This allows even an inexpensive communications device to conduct communications efficiently with a moving moving-body.

In the wireless communication system 1, the channel control unit 224 of the mobile relay station 2 generates channel change signals using channel information, which includes interfering-channel information or non-interfering-channel information as channel scan results, as well as using specifying information determined according to a predetermined condition. Then, the channel control unit 224 makes the transmission/reception unit 221 transmit the generated channel change signals to the terminal stations 3 and thereby controls the channels of the terminal stations 3 subject to channel change. In this way, channels can be controlled for the terminal stations 3 even if calculations or the like are not performed by the terminal stations 3 involving processing loads. This allows even an inexpensive communications device to conduct communications efficiently with a moving moving-body.

In the wireless communication system 1, predetermined numbers are assigned in advance to one or more terminal stations 3, and when there are one or more channels whose interference levels are equal to or higher than the threshold, the channel control unit 224 causes numbers selected randomly from predetermined numbers to be included as specifying information in channel change signals. Then, the transmission/reception unit 221 transmits the channel change signals to the terminal stations 3 to be communicated with. The use of such a method in transmitting the channel change signals to the terminal stations 3 eliminates the need for the mobile relay station 2 to communicate individually with the terminal stations 3 subject to channel change. This makes it possible to change channels efficiently.

In the wireless communication system 1, the transmission/reception unit 221 transmits the channel change signals to the terminal stations 3 using channels whose interference levels are lower than the threshold. Consequently, the use of congested channels is avoided in transmitting the channel change signals to the terminal stations 3. This makes it possible to deliver the channel change signals more reliably to the terminal stations 3 and thereby allows the terminal stations 3 subject to channel change to change their channels.

Second Embodiment

In a second embodiment, a mobile relay station receives terminal uplink signals via plural antennas and uses MIMO (Multiple Input Multiple Output) to transmit base station downlink signals.

Figure 3:
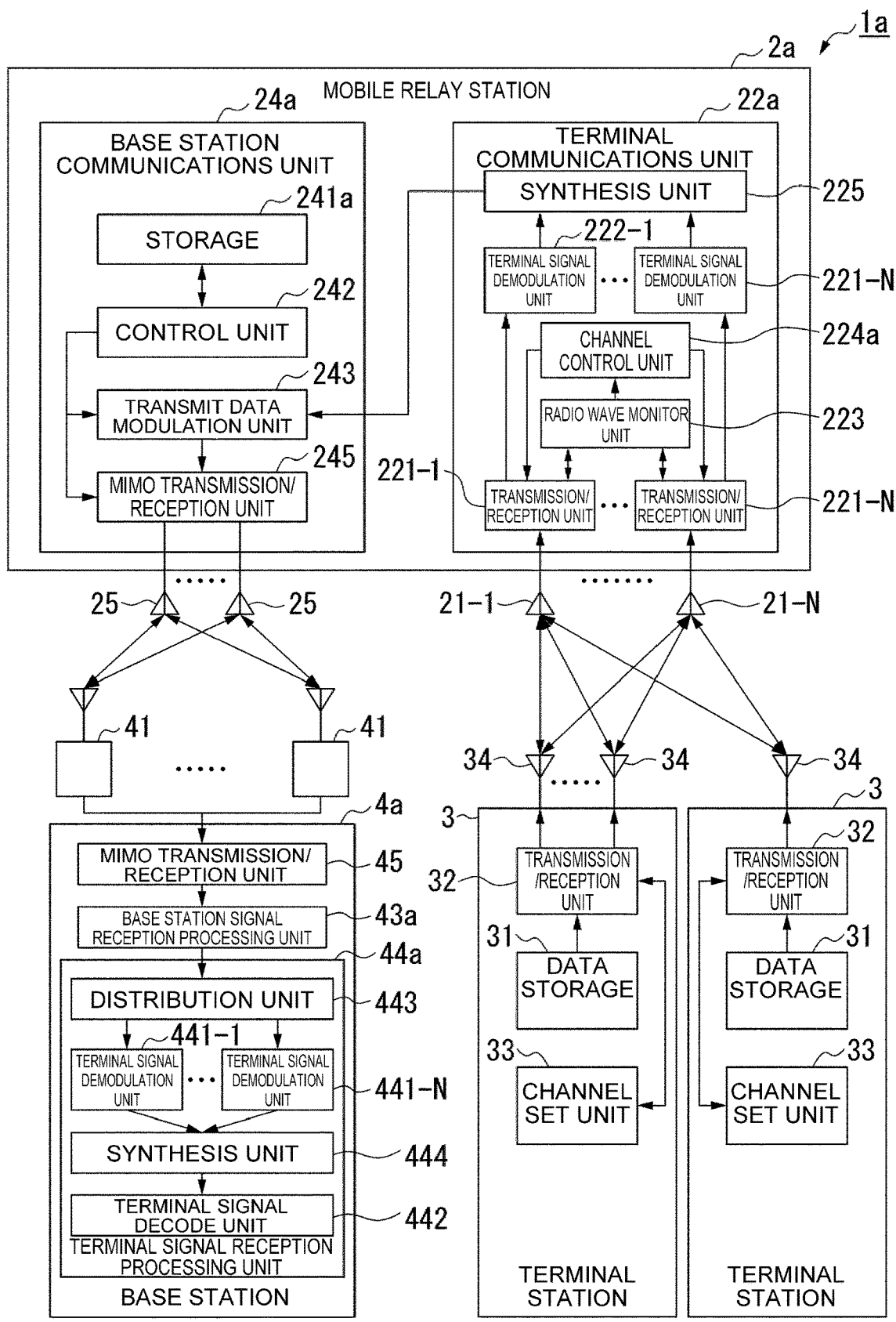
FIG. 3 is a configuration diagram of a wireless communication system according to a second embodiment.

FIG. 3 is a configuration diagram of a wireless communication system 1a according to a second embodiment. In FIG. 3, the same components as those of the wireless communication system 1 according to the first embodiment shown in FIG. 1 are denoted by the same reference signs as the corresponding components in FIG. 1, and description thereof will be omitted. The wireless communication system 1a includes a mobile relay station 2a, terminal station 3, and a base station 4a.

The mobile relay station 2a includes N antennas 21 (N is an integer equal to or larger than 2), a terminal communication unit 22a, a base station communication unit 24a, and plural antennas 25. Individual ones of the N antennas 21 will be referred to as antennas 21-1 to 21-N.

The terminal communication unit 22a includes N transmission/reception units 221, N terminal signal demodulation units 222, a wireless wave monitor unit 223, channel control unit 224a, and a synthesis unit 225. The N transmission/reception units 221 will be referred to as transmission/reception units 221-1 to 221-N. The N terminal signal demodulation units 222 will be referred to as terminal signal demodulation units 222-1 to 222-N.

The transmission/reception unit 221-n (n is an integer not smaller than 1 but not larger than N) conducts communications with the terminal stations 3. For example, the transmission/reception unit 221-n receives a terminal uplink signal via the antenna 21-n. For example, the transmission/reception unit 221-n transmits channel change signals to the terminal stations 3 via the antenna 21-n.

The terminal signal demodulation unit 222-n (n is an integer not smaller than 1 but not larger than N) demodulates the terminal uplink signal received by the transmission/reception unit 221-n and outputs the demodulation results to the synthesis unit 225.

Based on interference levels of respective channels measured by the wireless wave monitor unit 223, the channel control unit 224a controls the channels of the terminal stations 3 subject to channel change. A specific process of the channel control unit 224a is similar to that of the first embodiment described above. A difference from the first embodiment described above is that the channel control unit 224a transmits channel change signals to the terminal stations 3 via the transmission/reception unit 221-n.

The synthesis unit 225 combines demodulation results received as input from the respective terminal signal demodulation units 222-1 to 223-N and outputs resulting demodulation information to the base station communication unit 24a.

The base station communication unit 24a relays terminal uplink signals to the base station 4a using MIMO. The base station communication unit 24a includes a storage 241a, a control unit 242, a transmit data modulation unit 243, and a MIMO transmission/reception unit 245.

The storage 241a prestores weights for the base station downlink signals transmitted from the respective antennas 25, where the weights are classified by send time. The send time may be expressed, for example, by elapsed time with respect to the transmission start timing. The weights classified by send time are calculated based on orbital information about the LEO satellite and positions of the respective antennas 41. The orbital information about the LEO satellite provides information about the position, velocity, moving direction, and the like of the LEO satellite at any desired time. Note that a fixed weight may be used regardless of the send time.

The control unit 242 instructs the MIMO transmission/reception unit 245 to use the weights classified by send time and read out of the storage 241a.

When demodulation information is outputted by the synthesis unit 225, the transmit data modulation unit 243 accepts input of the demodulation information as transmit data, converts the transmit data into parallel signals, and modulates the parallel signals.

The MIMO transmission/reception unit 245 assigns weights to the modulated parallel signals based on instructions from the control unit 242 and thereby generates base station downlink signals to be transmitted from the respective antennas 25. The MIMO transmission/reception unit 245 transmits the generated base station downlink signals from the respective antennas 25 using MIMO.

The base station 4a includes plural antennas 41, a base station signal reception processing unit 43a, and a terminal signal reception processing unit 44a and a MIMO transmission/reception unit 45.

The antennas 41 are placed at positions away from one another so as to increase an angle difference of arrival of the signals from the plural antennas 25 of the mobile relay station 2. The antennas 41 output the base station downlink signals received from the mobile relay station 2 to the MIMO transmission/reception unit 45 by converting the signals into electric signals.

The MIMO transmission/reception unit 45 puts together the base station downlink signals received via the plural antennas 41. Based on orbital information about the LEO satellite and positions of the respective antennas 41, the MIMO transmission/reception unit 45 stores weights for the base station downlink signals received by the respective antennas 41 by classifying the weights by receive time.

The receive time may be expressed, for example, by elapsed time with respect to reception start timing. The MIMO transmission/reception unit 45 multiplies the base station downlink signals inputted through the respective antennas 41 by the weights corresponding to the receive times of the base station downlink signals and combines receive signals multiplied by the weights. Note that the same weight may be used regardless of the receive time.

The base station signal reception processing unit 43a demodulates and decodes the receive signals resulting from the combination and thereby obtains demodulation information. The base station signal reception processing unit 43a outputs the demodulation information to the terminal signal reception processing unit 44a.

The terminal signal reception processing unit 44a performs a reception process for the terminal uplink signals indicated by the receive waveform information. In so doing, the terminal signal reception processing unit 44a acquires terminal transmit data by performing a reception process based on the wireless communication scheme used for transmission by the terminal station 3. The terminal signal reception processing unit 44a includes N terminal signal demodulation units 441, a terminal signal decode unit 442, a distribution unit 443, and a synthesis unit 444. The N terminal signal demodulation units 441 will be referred to as terminal signal demodulation units 441-1 to 441-N.

The distribution unit 443 reads waveform data received at the same receive time out of the receive waveform information and outputs the read waveform data to the terminal signal demodulation units 441-1 to 441-N according to antenna identifiers associated with the waveform data. That is, the distribution unit 443 outputs the waveform data associated with the antenna identifier of the antenna 21-n to the terminal signal demodulation unit 441-n.

The terminal signal demodulation units 441-1 to 441-N demodulate respective signals represented by waveform data, and output symbols obtained by the demodulation to the synthesis unit 444. The terminal signal demodulation unit 441-n may perform demodulation after compensating the signal represented by the waveform data for the Doppler shift of the terminal uplink signal received by the antenna 21-n of the mobile relay station 2. The Doppler shift that impacts the terminal uplink signal received by each antenna 21-n is calculated in advance based on the position of the terminal station 3 and the orbital information about the LEO satellite carrying the mobile relay station 2b. The synthesis unit 444 additively synthesizes the symbols received as input from the terminal signal demodulation units 441-1 to 441-N, respectively, and outputs the result of additive synthesis to the terminal signal decode unit 442. The terminal signal decode unit 442 decodes the additively synthesized symbols and thereby obtains the terminal transmit data transmitted from the terminal station 3.

With the above configuration, even when the mobile relay station 2a receives terminal uplink signals via plural antennas and uses MIMO to transmit base station downlink signals, effects similar to those of the first embodiment can be obtained.

Variation Common to First Embodiment and Second Embodiment

A configuration in which predetermined numbers are assigned in advance to the terminal stations 3, and numbers that indicate the terminal stations 3 subject to channel change are used as specifying information is shown in the first embodiment and second embodiment described above. Other information may be used as the specifying information that specifies the terminal stations 3 subject to channel change. Suppose, for example, the mobile relay stations 2 and 2a hold information about the terminal stations 3. Examples of information about the terminal stations 3 include identification information about the terminal stations 3 and information about the channels used by the terminal stations 3.

In this case, the channel control units 224 and 224a select a predetermined number of terminal stations 3 from plural terminal stations 3 that use channels whose interference levels are equal to or higher than the threshold. Then, the channel control units 224 and 224a use identification information about the selected predetermined number of terminal stations 3 as the specifying information. Each of the terminal stations 3 that receive the channel change signal compares the identification information contained in the channel change signal with identification information about the local station. If the identification information contained in the channel change signal matches the identification information about the local station, the terminal station 3 changes the channel of the local station. On the other hand, if the identification information contained in the channel change signal does not match the identification information about the local station, the terminal station 3 does not change the channel of the local station.

This configuration makes it possible to change the channels of some terminal stations 3 that use channels whose interference levels are equal to or higher than the threshold. This allows even an inexpensive communications device to conduct communications efficiently with a moving moving-body.

Although a case where a moving body on which the mobile relay station is mounted is a LEO satellite has been described in the above embodiments, it may be a geostationary satellite, a drone, a HAPS, or another aircraft flying over the sky.

The channel control process performed by the channel control units 224, 224a and the process performed by the channel set unit 33 in the embodiments described above may be implemented by a computer. In that case, programs that implement these functions may be recorded on a computer-readable recording medium and read and executed by a computer system to implement the functions. It is assumed that the "computer system" referred to herein includes an OS and hardware such as peripheral devices. Also, the "computer-readable recording medium" refers to a portable medium such as a flexible disk, a magneto-optical disk, a ROM, or a CD-ROM, or a storage device such as a hard disk built into the computer system.

Furthermore, the "computer-readable recording medium" may include a recording medium such as a communications wire that dynamically holds a program for a short time when the program is transmitted through a network such as the Internet or a communications line such as a telephone line, and a recording medium such as a volatile memory that holds the program in the computer system for a set amount of time when the computer system is acting as a server or a client during the transmission. The above program may be designed to implement only part of the functions described above or implement the functions described above in conjunction with a program prestored in the computer system. Alternatively, the above functions may be implemented using a programmable logic device such as a FPGA (Field Programmable Gate Array).

Embodiments of the present invention have been described in detail above with reference to the accompanying drawings, but specific configurations of the present invention are not limited to the embodiments described above and include designs and the like without departing from the gist of the invention.

The present invention is applicable to techniques for conducting communications with mobile bodies carrying mobile relay stations.

REFERENCE SIGNS LIST

1, 1a Radio communications system
2, 2a Mobile relay station
3 Terminal station
4, 4a Base station
21-1 to 21-N Antenna
22, 22a Terminal communication unit
24, 24a Base station communication unit
25 Antenna
31 Data storage
32 Transmission/reception unit
33 Channel set unit
34 Antenna
41 Antenna
42 Transmission/reception unit
43, 43a Base station signal reception processing unit
44, 44a Terminal signal reception processing unit
45 MIMO transmission/reception unit
221-1 to 221-N Transmission/reception unit
222-1 to 222-N, 441-1 to 441-N Terminal signal demodulation unit
223 Radio wave monitor unit
224, 224a Channel control unit
225, 444 Combination unit
241 Storage
242 Control unit
243 Transmit data modulation unit
245 MIMO transmission/reception unit
443 Distribution unit

The invention claimed is:

1. A wireless communication system comprising:
one or more communications apparatuses; and
a relay device, which is mobile,
wherein the relay device includes a transmitter configured to transmit a channel change signal to the one or more communications apparatuses, the channel change signal containing channel information that indicates results corresponding to interference levels of a plurality of channels in a frequency band available for use in uplink transmission from the one or more communications apparatuses to the relay device and specifying information used to specify a communications device subject to channel change, and
the one or more communications apparatuses include a channel setter configured to set a channel having an interference level lower than a threshold as a channel to be used for communications with the relay device when the specifying information contained in the channel change signal is applicable.

2. The wireless communication system according to claim 1, further comprising a channel controller configured to control a channel of the one or more communications apparatuses subject to channel change by generating the channel change signal using the channel information and the specifying information and transmitting the generated channel change signal to the one or more communications apparatuses, the channel information including, as the results, information about a channel having the interference level equal to or higher than a threshold or information about a channel having the interference level lower than the threshold, the specifying information being determined according to a predetermined condition.

3. The wireless communication system according to claim 2,
wherein predetermined numbers are assigned in advance to the one or more communications apparatuses,
when there are one or more channels having the interference level equal to or higher than the threshold, the channel controller causes numbers selected randomly from the predetermined numbers to be included as the specifying information in the channel change signal, and
the transmitter transmits the channel change signal to a communications apparatus to be communicated with.

4. The wireless communication system according to claim 1, wherein the transmitter transmits the channel change signal to the one or more communications apparatuses using the channel having the interference level lower than the threshold.

5. A relay device, which is mobile, in a wireless communication system that includes one or more communications apparatuses and the relay device, the relay device comprising
a transmitter configured to transmit a channel change signal to the one or more communications apparatuses, the channel change signal containing channel information that indicates results corresponding to interference levels of a plurality of channels in a frequency band available for use in uplink transmission from the one or more communications apparatuses to the relay device and specifying information used to specify a communications apparatus subject to channel change, and
a channel controller configured to control a channel of the one or more communications apparatuses subject to channel change by generating the channel change signal using the channel information and the specifying information and transmitting the generated channel change signal to the one or more communications apparatuses, the channel information including, as the results, information about a channel having the interference level equal to or higher than a threshold or information about a channel having the interference level lower than the threshold, the specifying information being determined according to a predetermined condition.

6. A channel setting method for a wireless communication system that includes one or more communications apparatuses and a relay device, which is mobile, the channel setting method comprising:
causing the relay device to transmit a channel change signal to the one or more communications apparatuses, the channel change signal containing channel information that indicates results corresponding to interference levels of a plurality of channels in a frequency band available for use in uplink transmission from the one or more communications apparatuses to the relay device and specifying information used to specify a communications apparatus subject to channel change; and
causing the one or more communications apparatuses to set a channel having an interference level lower than a threshold as a channel to be used for communications with the relay device when the specifying information contained in the channel change signal is applicable.

* * * * *